(12) United States Patent
Cha et al.

(10) Patent No.: US 9,815,416 B2
(45) Date of Patent: Nov. 14, 2017

(54) BICYCLE CARRIER DEVICE FOR VEHICLE

(71) Applicant: Hyundai Motor Company, Seoul (KR)

(72) Inventors: Dong Eun Cha, Suwon-si (KR); Hyun Gyung Kim, Hwaseong-si (KR); Jin Young Yoon, Gimpo-si (KR); Seung Mok Lee, Osan-si (KR); Soo Hyun Hyun, Gyeongju-si (KR)

(73) Assignee: Hyundai Motor Company, Seoul (KR)

( * ) Notice: Subject to any disclaimer, the term of this patent is extended or adjusted under 35 U.S.C. 154(b) by 70 days.

(21) Appl. No.: 14/926,639

(22) Filed: Oct. 29, 2015

(65) Prior Publication Data

US 2017/0015255 A1    Jan. 19, 2017

(30) Foreign Application Priority Data

Jul. 14, 2015    (KR) .................. 10-2015-0099716

(51) Int. Cl.
*B60R 9/10* (2006.01)
*B60R 9/06* (2006.01)
*B60Q 1/26* (2006.01)

(52) U.S. Cl.
CPC .............. *B60R 9/10* (2013.01); *B60Q 1/2657* (2013.01); *B60Q 1/2661* (2013.01); *B60R 9/06* (2013.01)

(58) Field of Classification Search
CPC . B60R 9/045; B60R 2011/0082; B60R 19/50; B60R 9/06; B60R 9/10; B60Q 1/2661; B60Q 1/2657; B60Q 1/307; B60Q 1/2692; Y10T 403/315; Y10T 403/581
USPC ....... 224/282, 502, 553, 444, 314, 549, 432, 224/484–486, 489, 491, 497–498, 500, 224/501, 519–521, 42.34, 924; 220/666; 403/315, 316, 321, 322.4; 211/17–22
See application file for complete search history.

(56) References Cited

U.S. PATENT DOCUMENTS

| 5,445,300 | A  | 8/1995  | Eipper et al. |
| 6,139,247 | A  | 10/2000 | Wright |
| 6,783,315 | B1 | 8/2004  | Senechal |

(Continued)

FOREIGN PATENT DOCUMENTS

| DE | 10257903 A1 * | 6/2004 | ............ B60Q 1/305 |
| EP | 2570305 A2    | 3/2013 | |

(Continued)

*Primary Examiner* — Adam Waggenspack
(74) *Attorney, Agent, or Firm* — Morgan, Lewis & Bockius LLP

(57) ABSTRACT

A bicycle carrier device for a vehicle may include a carrier portion provided on a lower side of a bumper back beam to slidably move in forward and backward directions to be drawn out from or accommodated in the bumper back beam, and provided with a panel portion and a sliding rail extending from both side ends of the panel portion in the forward and backward directions, an illumination plate disposed on the panel portion of the carrier portion to be rotatable in upward and downward directions and provided with a lamp mechanism that emits light toward the panel portion when being upwardly rotated, an extended support portion disposed on the carrier portion to extend and spread in both side directions of the carrier portion to carry a bicycle thereon, and an illumination mechanism disposed on the extended support portion and configured to move along with the extended support portion.

12 Claims, 10 Drawing Sheets

(56) References Cited

U.S. PATENT DOCUMENTS

| | | | |
|---|---|---|---|
| 6,786,693 B1 | 9/2004 | Neale | |
| 7,909,213 B2 | 3/2011 | Bergerhoff et al. | |
| 7,992,751 B1 | 8/2011 | Sweeney | |
| 8,047,412 B2 * | 11/2011 | Premartin | B60R 9/06 |
| | | | 224/314 |
| 8,678,434 B2 * | 3/2014 | Lee | B60Q 1/2692 |
| | | | 280/760 |
| 9,039,263 B2 | 5/2015 | Hofmann et al. | |
| 9,174,584 B1 | 11/2015 | Cha et al. | |
| 2007/0090142 A1 | 4/2007 | Chuang | |
| 2008/0142559 A1 | 6/2008 | Lim et al. | |
| 2008/0203750 A1 | 8/2008 | Premartin et al. | |
| 2010/0001029 A1 | 1/2010 | Tai | |
| 2011/0002763 A1 | 1/2011 | Earl et al. | |
| 2011/0108592 A1 | 5/2011 | Lee et al. | |
| 2012/0024923 A1 | 2/2012 | Cha et al. | |
| 2013/0182454 A1 | 7/2013 | Hoffmann et al. | |
| 2015/0165981 A1 | 6/2015 | Kim et al. | |
| 2016/0052458 A1 | 2/2016 | Cha et al. | |

FOREIGN PATENT DOCUMENTS

| | | |
|---|---|---|
| JP | 11-28983 A | 2/1999 |
| JP | 2008-13175 A | 1/2008 |
| KR | 10-2011-0034733 A | 4/2011 |
| KR | 10-2011-0035378 A | 4/2011 |
| KR | 10-2011-0045193 A | 5/2011 |
| KR | 10-2011-0050162 A | 5/2011 |
| KR | 10-2013-0036913 A | 4/2013 |

* cited by examiner

BICYCLE CARRIER DEVICE FOR VEHICLE

CROSS REFERENCE TO RELATED APPLICATION

The present application claims priority to Korean Patent Application No. 10-2015-0099716, filed Jul. 14, 2015, the entire contents of which is incorporated herein for all purposes by this reference.

BACKGROUND OF THE INVENTION

Field of the Invention

The present invention relates to a bicycle carrier device for a vehicle, which is installed on a rear bumper side of the vehicle to carry a bicycle and a baggage thereon.

Description of Related Art

Recently, as a bicycle is used as means for leisure activities, the bicycle is carried on a vehicle to move the bicycle to a biking road or to the neighborhood of a mountain.

However, since the bicycle generally has a large size, it is difficult to carry the bicycle in the vehicle even using a trunk or a back seat compartment of the vehicle.

To solve this problem, various schemes for carrying a bicycle out of the vehicle have been proposed. However, in the case of carrying a bicycle through fixing the bicycle to a loop panel of the vehicle, the carrying work itself causes great inconvenience, and the height of the vehicle is increased to cause a safety accident when the vehicle enters into a tunnel or a building.

In the case of carrying a bicycle at a rear end of a tail gate of the vehicle, it is necessary to install a separate carrier device on the tail gate to cause inconvenience. Further, even normal times when the bicycle is not carried, a carrier device is exposed to an outside to hinder the vehicle exterior design.

In addition, in the case where it is necessary to carry the bicycle on the vehicle, it is required to manually install the carrier device, while in the case where it is not necessary to carry the bicycle, it is required to take away the carrier device to cause lack of convenience in use.

Particularly, in the case where the bicycle is carried out of the vehicle through the carrier device, a rear-side vehicle may approach the subject vehicle without recognizing carriage of the bicycle, and this may cause collision accident.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bicycle carrier, which is installed on a rear bumper side of a vehicle to carry a bicycle and a baggage thereon in a manner that the carrier is accommodated in a bumper back beam normal times, but is drawn out to enable the bicycle to be carried thereon.

In particular, various aspects of the present invention are directed to providing a bicycle carrier device for a vehicle, which enables a rear-side vehicle to recognize carriage of a bicycle in a state where the bicycle is carried thereon.

According to various aspects of the present invention, a bicycle carrier device for a vehicle may include a carrier portion provided on a lower side of a bumper back beam to slidably move in forward and backward directions to be drawn out from or accommodated in the bumper back beam, and provided with a panel portion and a sliding rail extending from both side ends of the panel portion in the forward and backward directions, an illumination plate disposed on the panel portion of the carrier portion to be rotatable in upward and downward directions and provided with a lamp mechanism that emits light toward the panel portion when being upwardly rotated, an extended support portion disposed on the carrier portion to extend and spread in both side directions of the carrier portion to carry a bicycle thereon, and an illumination mechanism disposed on the extended support portion to extend and spread in the both side directions, and configured to move along with the extended support portion and to emit light toward a rear side.

A guide rail that extends in the forward and backward directions may be provided on the bumper back beam, and the sliding rail of the carrier portion may be slidably connected to the guide rail.

An extended rail that extends to cross the sliding rail may be fixed to the carrier portion, and the extended support portion may be slidably connected to the extended rail to slide along the extended rail in the both side directions.

The illumination plate may include a rotating bracket installed on an upper side of the panel portion of the carrier portion to be rotatable in the upward and downward directions, and formed to extend over a predetermined length, and a switch bracket provided at an end of the rotating bracket to be drawn out in accordance with a user's operation in a state where the lamp mechanism is accommodated therein.

The rotating bracket may have a lower end which is rotatably coupled to a front side of the panel portion and is rotatably installed at right angles in a horizontally lying state, and an upper end at which the switch bracket is fixedly installed.

The switch bracket may include a fixing portion fixedly disposed at the upper end of the rotating bracket, a guide portion fixed to a rear side of the fixing portion in a state where the rotary bracket is rotated at right angles, formed to surround the lamp mechanism, and having a rear end that is opened so that the lamp mechanism can be drawn out through the rear end, and a switch portion having a first end portion that is slidably installed on the fixing portion in the upward and downward directions and a second end portion bent downward after extending to an upper side and formed to penetrate an upper end of the guide portion.

The guide portion may have a first fixing hole which is formed at the upper end thereof and through which the second end portion of the switch portion passes, a second fixing hole which is formed to be spaced apart for a predetermined distance from the first fixing hole to the rear side, and a guide hole formed at a front end thereof to be recessed for a predetermined distance in the upward and downward directions, in which a rear end thereof may be formed to be opened.

The lamp mechanism may include an illumination portion provided to be movable on an inside of the guide portion and having a front end connected to the inside of the guide portion through an elastic member, and a locking projection formed to project from an upper end of the illumination portion and to be selectively inserted and locked in the first fixing hole or the second fixing hole of the guide portion as the illumination portion moves.

The first end portion of the switch portion may be connected to the fixing portion through an elastic body and may be provided with a guide projection formed thereon to be inserted into the guide hole, and the second end portion thereof may horizontally extend for a predetermined distance toward the rear side after extending to an upper side and may be bent downward to be inserted into the first fixing hole.

The illumination mechanism may include a fixing rod fixedly disposed on the extended support portion, a lamp bracket disposed on the fixing rod to be movable in the forward and backward directions or to be rotatable in a side direction and provided with a lamp portion emitting light toward the rear side, and a rotation adjusting portion fixed to the fixing rod to limit or permit rotation of the lamp bracket as the lamp bracket moves in the forward and backward directions.

The rotation adjusting portion may be formed in a circular shape and may have a position fixing groove recessively formed at mutually symmetrical positions on a circumference thereof, and the lamp bracket may be formed to surround the circumference of the rotation adjusting portion and may have a position fixing projection formed to project therefrom to be inserted into or withdrawn from the position fixing groove as moving in the forward and backward directions.

The lamp bracket may be disposed on the fixing rod to be elastically supported in the forward and backward directions.

According to the bicycle carrier device for a vehicle having the above-described configuration, since the bicycle carrier is disposed on the rear bumper back beam of the vehicle in a manner that the bicycle carrier is not exposed to the outside normal times, but is automatically drawn from the bumper back beam to enable the bicycle to be carried thereon if it is required to carry the bicycle, the exterior design can be maintained and convenience can be improved.

In particular, since the bicycle carrier device enables a rear-side vehicle to recognize carriage of a bicycle in a state where the bicycle is carried thereon, safety can be secured.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
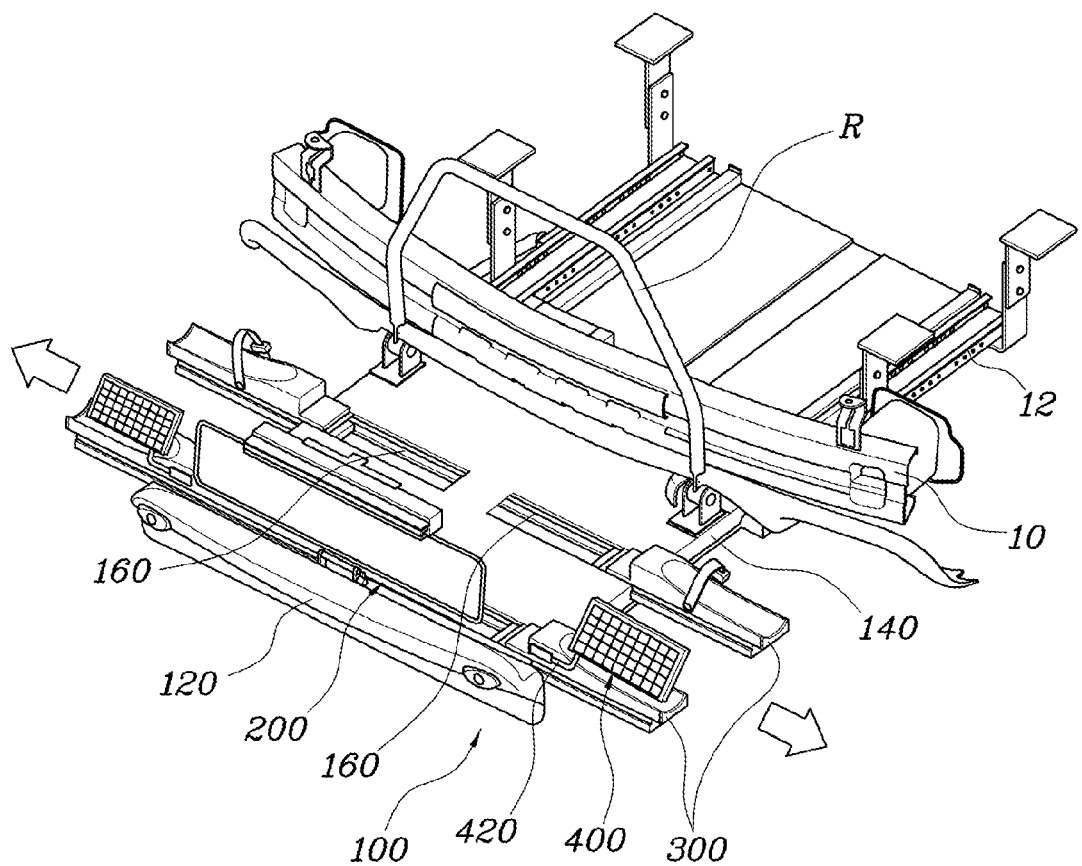
FIG. 1 is a perspective view of a bicycle carrier device for a vehicle in accordance with the present invention.
Figure 2:
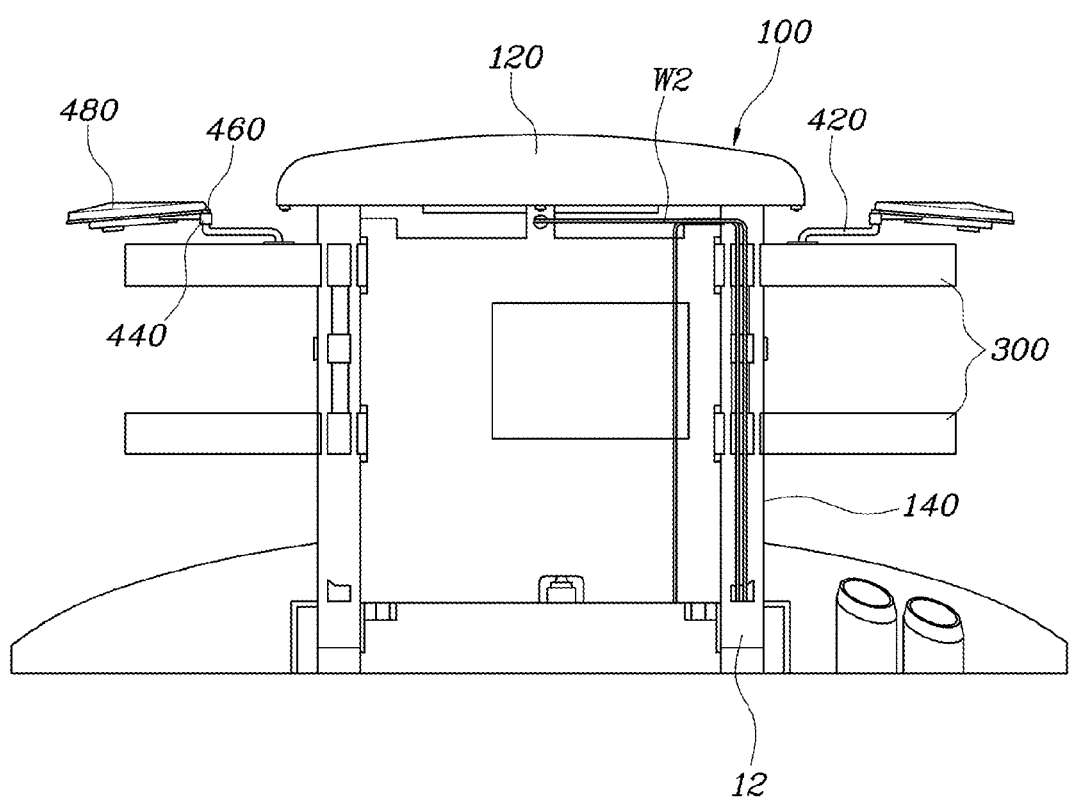
FIG. 2 is a plan view of the bicycle carrier device for the vehicle illustrated in FIG. 1.

As illustrated in FIG. 1, a carrier device for a vehicle according to the present invention includes a carrier portion 100 provided on a lower side of a bumper back beam 10 to slidably move in forward and backward directions so as to be drawn out from or accommodated in the bumper back beam 10, and provided with a panel portion 120 and a sliding rail 140 extending from both side ends of the panel portion 120 in the forward and backward directions, an illumination plate 200 installed on the panel portion 120 of the carrier portion 100 to be rotatable in upward and downward directions and provided with a lamp mechanism 220 that emits light toward the panel portion 120 when being upwardly rotated, an extended support portion 300 installed on the carrier portion 100 to extend and spread in both side directions of the carrier portion 100 to carry a bicycle thereon, and an illumination mechanism 400 installed on the extended support portion 300 to extend and spread in the both side directions, and configured to move along with the extended support portion 300 and to emit light toward a rear side.

The bicycle carrier according to the present invention may be installed on the bumper back beam 10 on the rear side of the vehicle, and may be configured to be drawn out from or be accommodated in the bumper back beam 10, or to be drawn out from or be accommodated in the lower side of the bumper back beam 10. Further, the bicycle carrier is provided with the extended support portion 300 that extends and spreads in the side directions to carry a bicycle thereon after the carrier portion 100 is drawn out, and thus the usage of the bicycle carrier is facilitated.

In particular, the illumination plate 200 is installed on the panel portion 120 of the carrier portion 100. Since the illumination plate 200 is installed to be rotatable in the upward and downward directions on the panel portion 120 of the carrier portion 100, it maintains a horizontal state in a state where the carrier portion 100 is accommodated in the bumper back beam 10 to enable the carrier portion 100 to be accommodated therein. Further, in a state where the carrier portion 100 is drawn out, the illumination plate 200 is rotated in a vertical state to emit light toward the panel portion 120 through the lamp mechanism 220. Since the illumination plate 200 is vertically rotated and emits light toward the panel portion 120 through the lamp mechanism 220, a rear-side vehicle can recognize to what extent the carrier portion 100 is drawn out.

In addition, according to the present invention, the illumination mechanism 400 is installed on the extended support portion 300 on which the bicycle is carried. The illumination mechanism 400 moves together with the extended support portion 300, and when the illumination mechanism 400 emits light, it can be recognized to what extent the extended support portion 300 extends and spreads. Accordingly, the rear-side vehicle can confirm the drawn state of the carrier portion 100, and thus safe driving can be kept.

According to the present invention, as shown in FIG. 1, a guide rail 12 that extends in the forward and backward directions may be provided on the bumper back beam 10, and the sliding rail 140 of the carrier portion 100 may be slidably connected to the guide rail 12.

That is, the sliding rail 140 of the carrier portion 100 is provided to be movable along the guide rail 12 that is fixedly installed on the bumper back beam 10. Here, on the carrier portion 100, a separate driving motor that is connected to the guide rail 12 is provided, and when the driving motor that is in sliding contact with the guide rail 12 is driven, the carrier portion 100 moves along the guide rail 12. For this, a pinion structure is applied to the driving motor, a lack structure is applied to the guide rail 12, and thus the driving motor and the guide rail 12 are connected to each other in a rack and pinion structure. The operation of the driving motor may be controlled through user's remote control.

Further, on the carrier portion 100, a rack bar R is rotatably installed on the opposite side of the panel portion 120 to fix the bicycle to the rack bar after the bicycle is carried on the extended support portion 300, and thus even during the driving of the vehicle, the bicycle can be firmly carried on the carrier portion 100.

On the other hand, an extended rail 160 that extends to cross the sliding rail 140 may be fixed to the carrier portion 100, and the extended support portion 300 may be slidably connected to the extended rail 160 to slide along the extended rail 160 in the both side directions.

That is, as shown in FIG. 1, the extended rail 160 that crosses the sliding rail 140 in the side directions is provided on the carrier portion 100, and the extended support portion 300 is connected to the extended rail 160 to slide along the extended rail 160. A pair of extended support portions 300 may be configured to spread in the both side directions, and thus may be set to match the width of the bicycle.

On the other hand, with reference to FIGS. 3 to 6, the illumination plate 200 according to the present invention will be described in detail. The illumination plate 200 may include a rotating bracket 240 installed on an upper side of the panel portion 120 of the carrier portion 100 to be rotatable in the upward and downward directions and formed to extend for a predetermined length, and a switch bracket 260 provided at an end of the rotating bracket 240 to be drawn out in accordance with a user's operation in a state where the lamp mechanism 220 is accommodated therein.

That is, the rotating bracket 240 of the illumination plate 200 is configured to be rotated in the upward and downward directions depending on whether the carrier portion 100 is drawn out or accommodated, and the switch bracket 260 is rotated together with the rotating bracket 240. Accordingly, if the rotating bracket 240 is rotated upwardly in a state where the carrier portion 100 is drawn out, the operating condition of the switch bracket 260 is satisfied, and in this state, if a user operates the switch bracket 260, the lamp mechanism 220 is drawn out to emit light.

Figure 3:
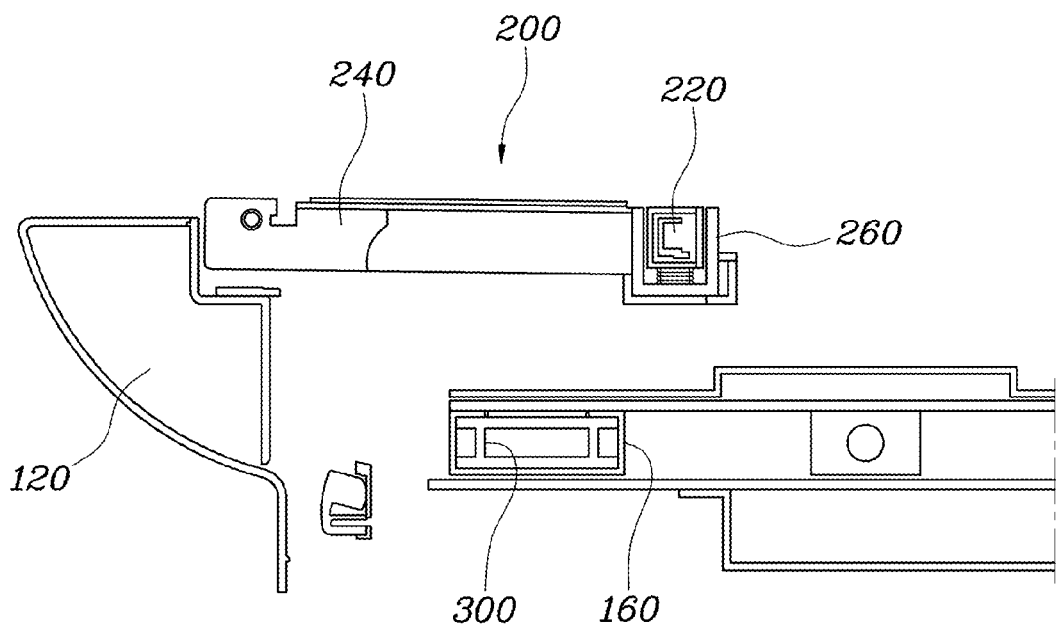
FIG. 3 and FIG. 4 are views showing the operation of an illumination plate of the exemplary bicycle carrier device for the vehicle illustrated in FIG. 1.
Figure 4:
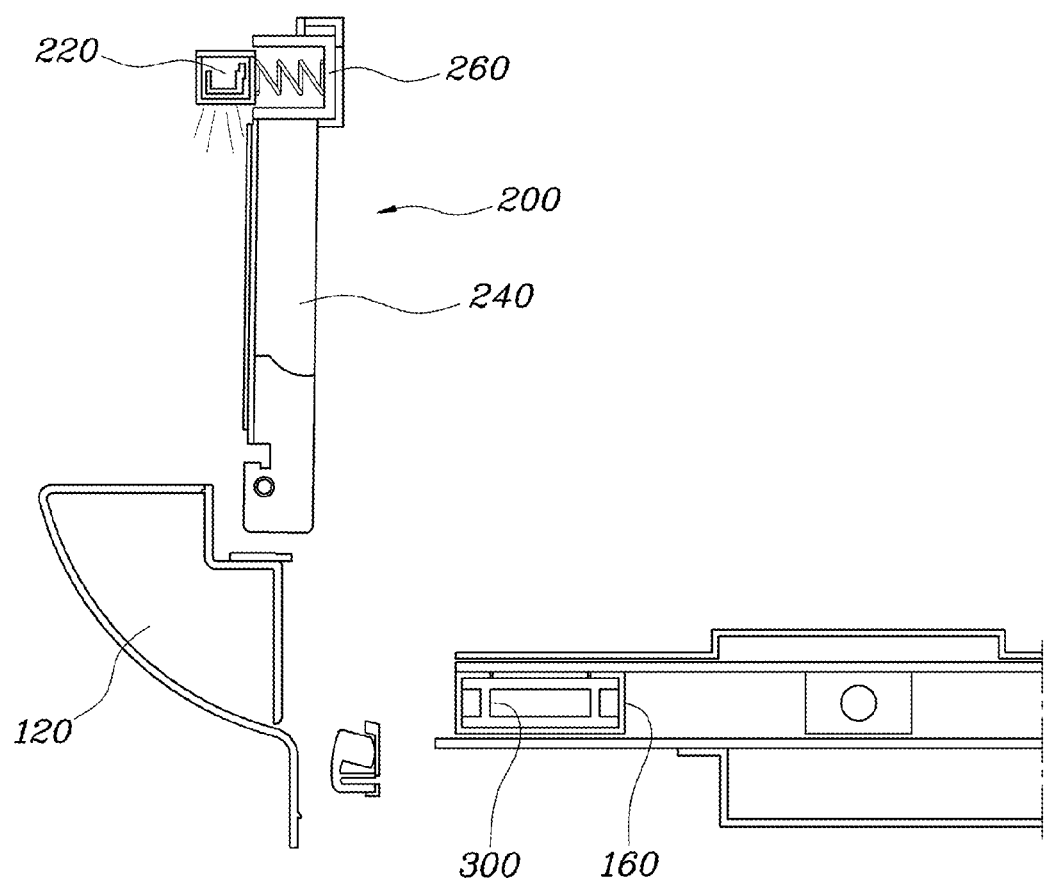

Specifically, as shown in FIGS. 3 and 4, the rotating bracket 240 may have a lower end which is rotatably coupled to a front side of the panel portion 120 and is rotatably installed at right angles in a horizontally lying state, and an upper end at which the switch bracket 260 is fixedly installed. That is, the lower end of the rotating bracket 240 is installed on the front side of the panel portion 120 and is configured to move from the front side to the rear side. Accordingly, in a state where the rotating bracket 240 is accommodated in the carrier portion 100, it maintains a horizontally lying state, whereas in a state where the carrier portion 100 is drawn out, the rotating bracket 240 is rotated at right angles to be exposed to an outside.

Figure 5:
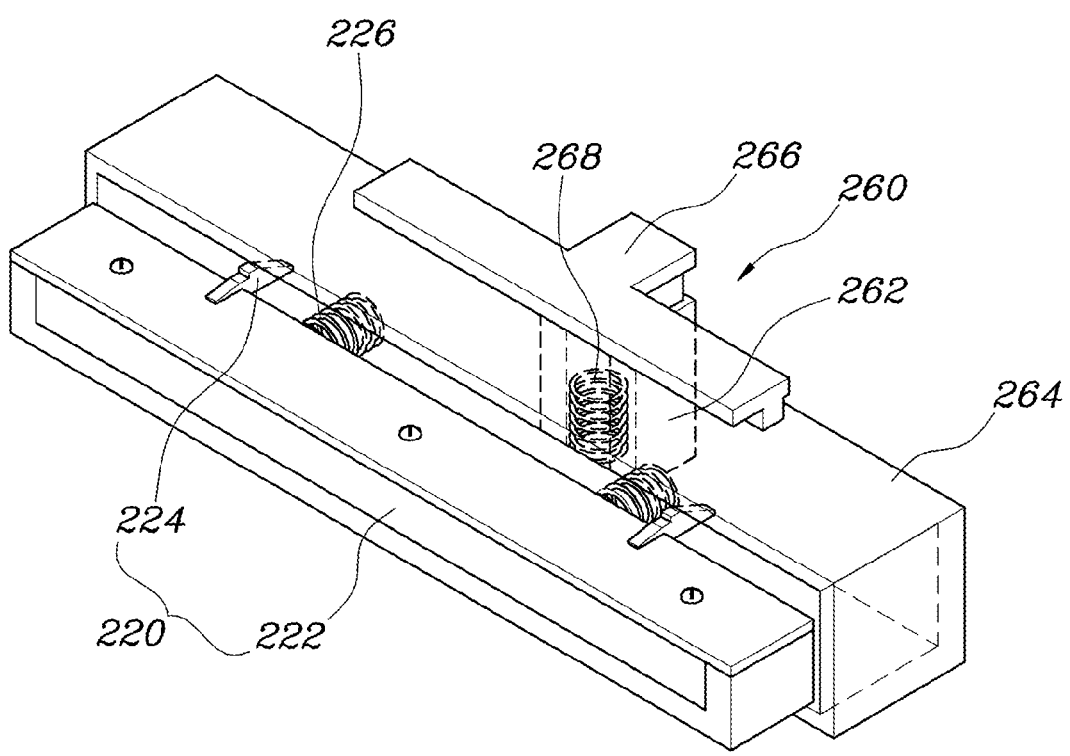
FIG. 5 and FIG. 6 are views showing an illumination plate of the exemplary bicycle carrier device for the vehicle illustrated in FIG. 1.
Figure 6:
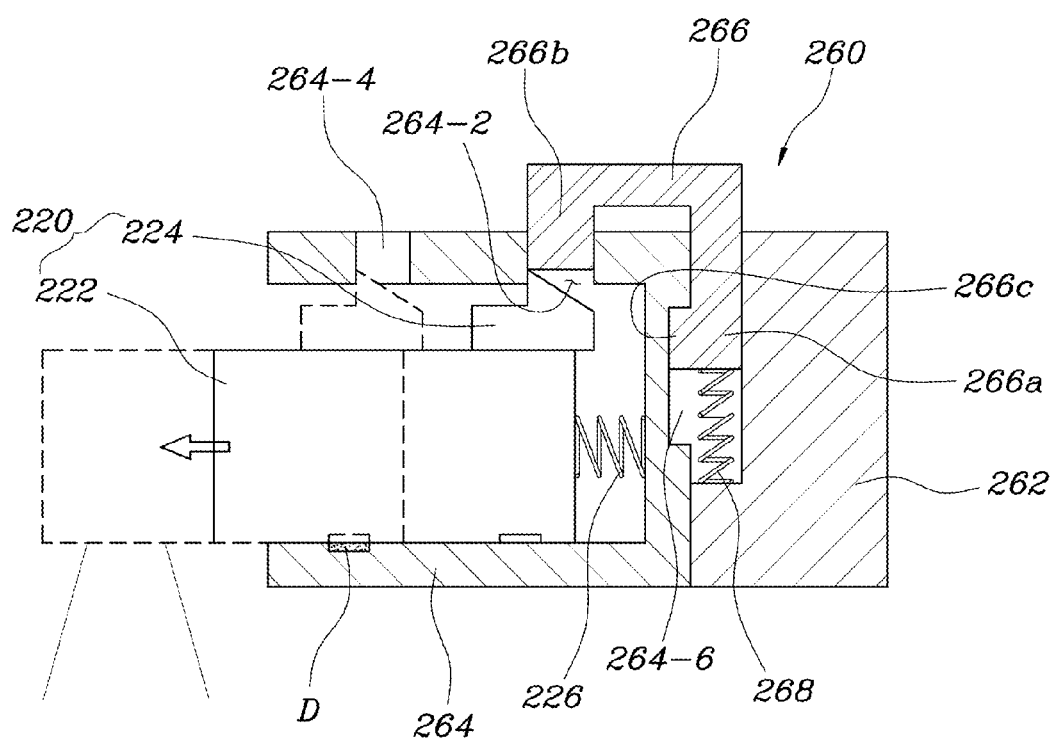

Here, as shown in FIGS. 5 and 6, the switch bracket 260 may include a fixing portion 262 fixedly installed at the upper end of the rotating bracket 240, a guide portion 264 fixed to a rear side of the fixing portion 262 in a state where the rotary bracket 240 is rotated at right angles, formed to surround the lamp mechanism 220, and having a rear end that is opened so that the lamp mechanism 220 can be drawn out through the rear end, and a switch portion 266 having one end portion 266a that is slidably installed on the fixing portion 262 in the upward and downward directions and the other end portion 266b bent downward after extending to an upper side and formed to penetrate an upper end of the guide portion 264.

FIGS. 5 and 6 illustrate a state where the rotating bracket 240 is rotated at right angles. As illustrated in FIGS. 5 and 6, the fixing portion 262 is fixed to the upper end of the rotating bracket 240, and the guide portion 264 in which the lamp mechanism 220 is accommodated is fixed to the fixing portion 262. Here, since the fixing portion 262 is formed to surround the lamp mechanism 220, the lamp mechanism 220 is accommodated in the fixing portion 262, but the rear end thereof is opened to enable the lamp mechanism 220 to be drawn out through the rear end.

On the other hand, the one end portion 266a of the switch portion 266 is slidably installed on the fixing portion 262, and the other end portion 266b thereof is bent downward after extending to the upper side and is formed to penetrate the upper end of the guide portion 264. Through this, the switch portion 266 is shaped to be bent to the upper side and then to be bent downward, and thus the user can operate the switch portion 266 by pressing extended portions of the one end portion 266a and the other end portion 266b. Accordingly, if the user operates the switch portion 266, the one end portion 266a is pressed from the fixing portion 262 to the lower side, and the other end portion 266b moves downward in a state where it penetrates the upper end of the guide portion 264 at the same time, resulting in that the lamp mechanism 220 that is provided on the inner side of the guide portion 264 is drawn out.

The drawing operation of the lamp mechanism 220 will now be described in detail. As illustrated in FIG. 4, the guide portion 264 may have a first fixing hole 264-2 which is formed at the upper end thereof and through which the other end portion 266b of the switch portion 266 passes, a second fixing hole 264-4 which is formed to be spaced apart for a predetermined distance from the first fixing hole 264-2 to the rear side, and a guide hole 264-6 formed at a front end thereof to be recessed for a predetermined distance in the upward and downward directions, wherein a rear end thereof may be formed to be opened.

On the other hand, the lamp mechanism 220 may include an illumination portion 222 provided to be movable on an inside of the guide portion 264 and having a front end connected to the inside of the guide portion 264 through an elastic member 226, and a locking projection 224 formed to project from an upper end of the illumination portion 222 and to be selectively inserted and locked in the first fixing hole 264-2 or the second fixing hole 264-4 of the guide portion 264 as the illumination portion 222 moves.

Further, the one end portion 266*a* of the switch portion 266 may be connected to the fixing portion 262 through an elastic body 268 and may be provided with a guide projection 266*c* formed thereon to be inserted into the guide hole 264-6, and the other end portion 266*b* thereof may horizontally extend for a predetermined distance toward the rear side after extending to an upper side and may be bent downward to be inserted into the first fixing hole 264-2.

That is, the locking projection 224 that projects from the upper end of the upper end of the illumination portion 222 is inserted into the lower side of the first fixing hole 264-2 of the guide portion 264 to keep a lock state, and the other end portion 266*b* of the switch portion 266 is inserted into the upper side of the first fixing hole 264-2 of the guide portion 264 to correspond to the locking projection 224.

Here, the one end portion 266*a* of the switch portion 266 is connected to the fixing portion 262 to be elastically supported in the upward and downward directions through the elastic body 268, and the guide projection 266*c* is formed to project to the rear side and to be inserted into the guide hole 264-6. Through this, if a user presses the switch portion 266, the guide projection 266*c* of the switch portion 266 moves downward along the guide hole 264-6, and the other end portion 266*b* thereof moves downward from the first fixing hole 264-2 at the same time to press the locking projection 224 of the lamp mechanism 220 downward.

Accordingly, the locking projection 224 formed on the illumination portion 222 is withdrawn from the first fixing hole 264-2, and the illumination portion 222 moves to the rear side by the elastic force of the elastic member 226. In this case, after the illumination portion 222 moves for a predetermined distance, the locking projection 224 is inserted and locked in the second fixing hole 264-4, and thus the illumination portion 222 can be fixedly located in a state where the illumination portion 222 is drawn out from the guide portion 264. The locking projection 224 is configured to be elastically supported, and even if the illumination portion 222 is pressed by the other end portion 266*b* of the switch portion 266, the illumination portion 222 may return to its own position to be inserted into the other fixing hole. In this case, the locking projection 224 may be elastically modified.

As described above, the lamp mechanism 220 may be configured to be drawn out from the guide portion 264 in accordance with the operation of the switch portion 266. Since the locking projection 224 that is formed at the upper end of the illumination portion 222 has the rear side that is vertically formed at right angles and the front side that is formed to have inclination, the returning operation of the lamp mechanism 220 is performed in a manner that when a user presses the illumination portion 222 that is drawn out from the guide portion 264, the illumination portion 222 moves as pressing the elastic member 226, and thus the locking projection 224 is fixedly inserted into the first fixing hole 264-2 after seceding from the second fixing hole 264-4.

Here, the one end portion 266*a* of the switch portion 266 is elastically supported through the elastic body 268, and if a user's operation force is released, the switch portion 266 returns upward by the elastic force of the elastic body 268.

In particular, according to the present invention, as the switch portion 266 is operated, the illumination portion 222 of the lamp mechanism 220 is drawn from the guide portion 264, and if the switch portion 266 is pressed, the illumination portion 22 moves to emit light. However, this is merely exemplary, and as illustrated in FIG. 6, a contact terminal D may be provided to mutually correspond to the illumination portion 222 and the guide portion 264. In this case, the illumination portion 222 moves to come in contact with the contact terminal D and to emit light.

Figure 7:
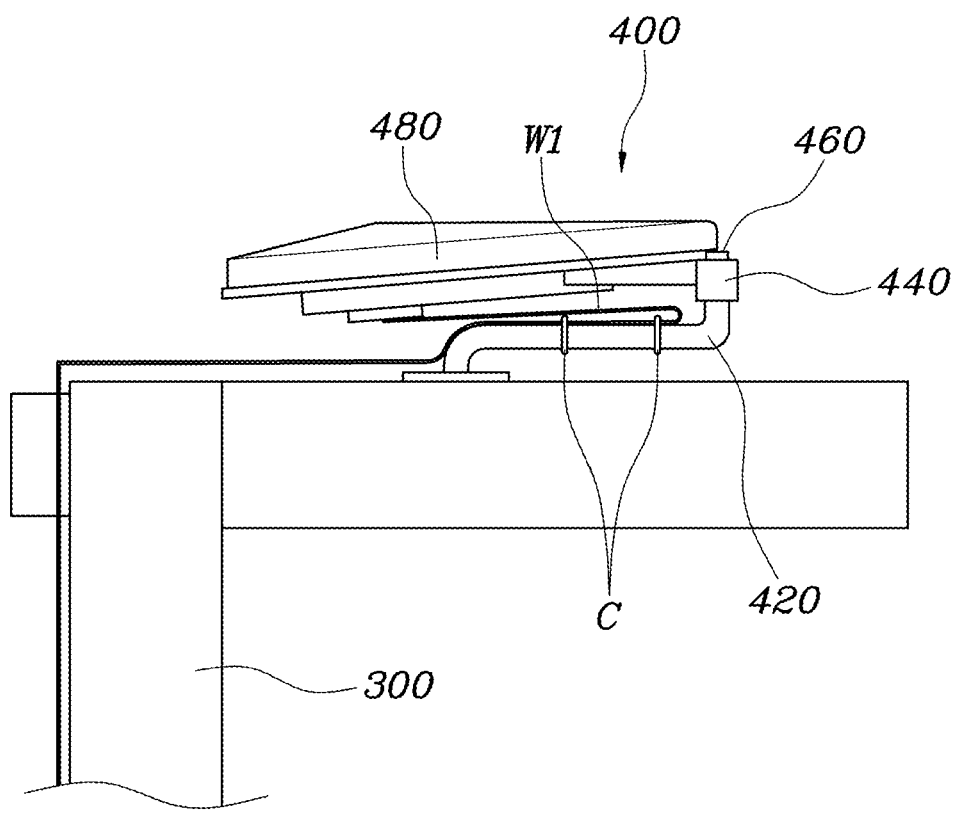
FIG. 7 and FIG. 8 are views illustrating an extended support portion and an illumination mechanism of the exemplary bicycle carrier device for the vehicle illustrated in FIG. 1.
Figure 8:
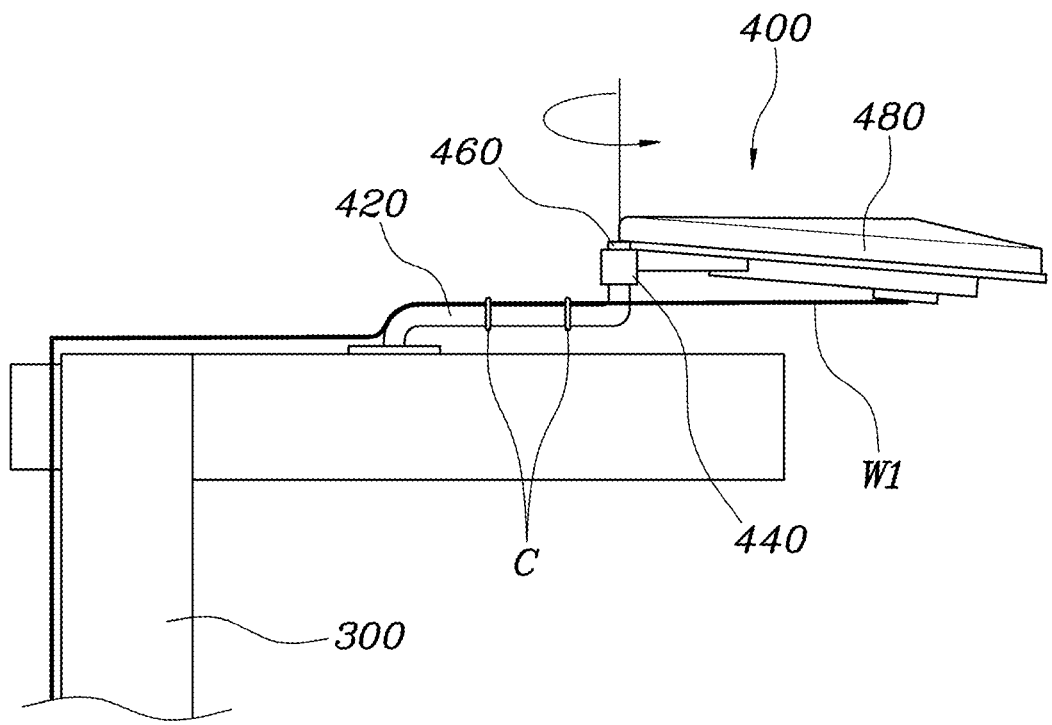
Figure 9:
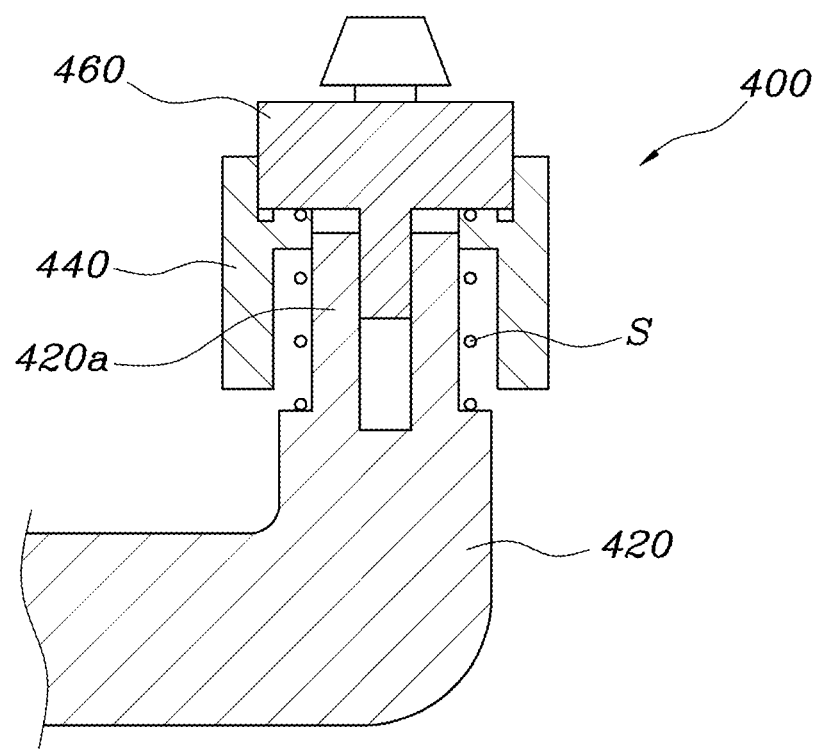
FIG. 9 and FIG. 10 are views explaining an illumination mechanism of the exemplary carrier device for the vehicle illustrated in FIG. 1.

On the other hand, as illustrated in FIGS. 7 and 8, the illumination mechanism 400 may include a fixing rod 420 fixedly installed on the extended support portion 300, a lamp bracket 440 installed on the fixing rod 420 to be movable in the forward and backward directions or to be rotatable in a side direction and provided with a lamp portion 480 emitting light toward the rear side, and a rotation adjusting portion 460 fixed to the fixing rod 420 to limit or permit rotation of the lamp bracket 440 as the lamp bracket 440 moves in the forward and backward directions.

Specifically, the fixing rod 420 is fixedly installed on the extended support portion 300 and moves together with the extended support portion 300. On the fixing rod 420, the lamp bracket 440 is installed to be movable in the forward and backward directions or to be rotatable in the side direction. That is, a rotating shaft 420*a* is formed to project from the fixing rod 420, and the lamp bracket 440 is rotatably installed on the rotating shaft 420*a* so that the lamp bracket 440 can move along the rotating shaft 420*a* in the forward and backward directions.

Through this, since the lamp bracket 440 moves along the rotating shaft 420*a* of the rotation adjusting portion in the forward and backward directions, it may be withdrawn from the rotation adjusting portion that is coupled to the fixing rod 420 to be rotated.

Figure 10:
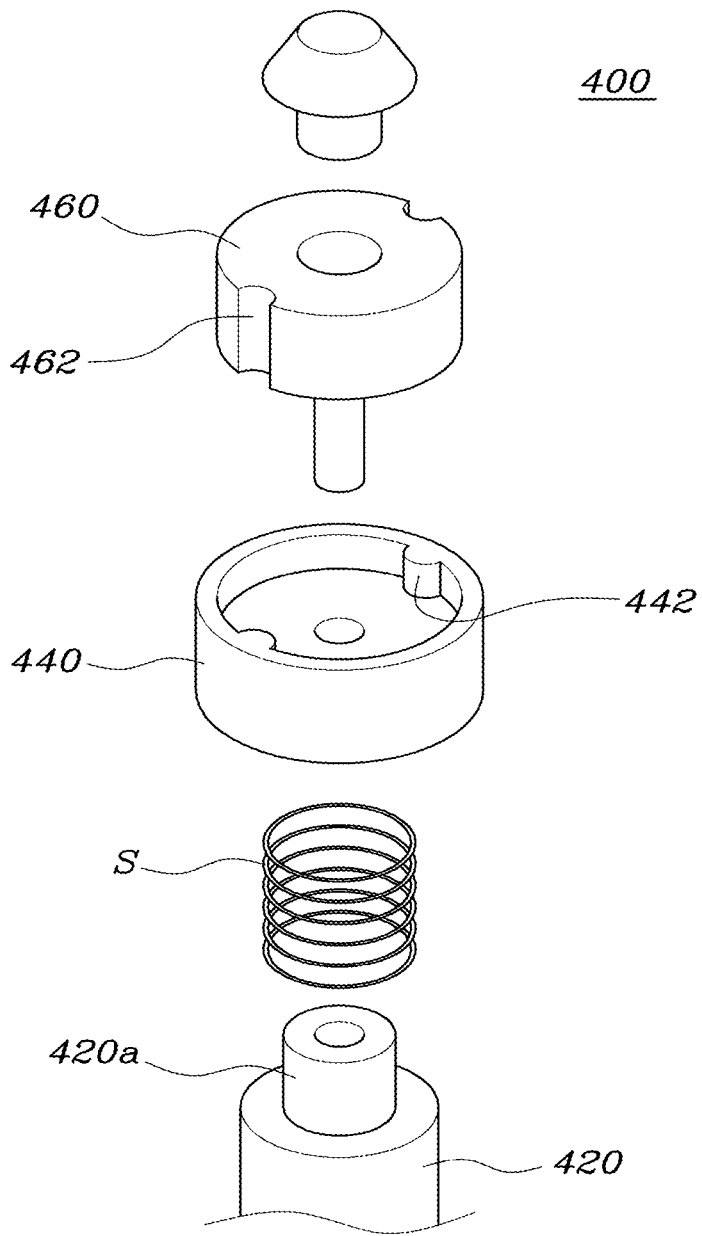

Specifically, as shown in FIG. 10, the rotation adjusting portion 460 may be formed in a circular shape and have a position fixing groove 462 recessively formed at mutually symmetrical positions on a circumference thereof, and the lamp bracket 440 may be formed to surround the circumference of the rotation adjusting portion 460 and have a position fixing projection 442 formed to project therefrom to be inserted into or withdrawn from the position fixing groove 462 as moving in the forward and backward directions.

As described above, the position fixing groove 462 is formed on the rotation adjusting portion 460, and the position fixing projection 442 that is formed to correspond to the position fixing groove 462 is formed on the lamp bracket 440. Accordingly, if the position fixing projection 442 of the lamp bracket 440 is inserted, the rotation of the lamp bracket 440 is limited, and thus the position of the lamp portion 480 is fixed.

In this state, if a user presses the lamp portion 480 forward, the lamp bracket 440 moves to the front side, and thus the position fixing projection 442 is withdrawn from the position fixing groove 462 of the rotation adjusting portion 460. Accordingly, the rotation of the lamp bracket 440 is permitted, and thus the lamp bracket 440 becomes rotatable about the rotating shaft 420*a* of the fixing rod 420 to change the position of the lamp portion 480.

Here, the lamp bracket 440 may be installed on the fixing rod 420 to be elastically supported in the forward and backward directions.

That is, an elastic spring S is provided between the lamp bracket 440 and the fixing rod 420, and even if the lamp bracket 440 moves in the forward and backward directions, it returns to its original position when the user's operation force is released to prepare a next operation.

In addition, the lamp portion 480 is connected to a wire W1 for receiving a supply of power for the lamp portion 480 to emit light, and this wire W1 is connected to the lamp portion 480 via the extended support portion 300. The wire may be twisted when the lamp bracket 440 is rotated to change the position of the lamp portion 480. To solve this problem, the wire W1 may be fixed to the fixing rod 420 through a separate bracket or a clip C, and may be made to freely move on the portion of the rotating shaft 420a of the fixing rod 420 so as to follow the position change of the lamp portion 480 and to prevent the wire W1 from being twisted.

On the other hand, a wire W2 for supplying the power may be connected to the lamp mechanism 220 that is connected to the illumination plate 200, and in this case, the wire W2 may be connected to the lamp mechanism 220 via the sliding rail 140.

Here, if a power supply for supplying the power is fixedly installed on the side of the rear bumper of the vehicle, the extended wire W2 may be twisted when the sliding rail 140 is accommodated in the rear bumper side to accommodate the carrier portion. Accordingly, by applying a structure in which the wire W2 is wound on the rear bumper side in the form of a roll, the wire W2 can be prevented from being twisted.

According to the bicycle carrier device for a vehicle having the above-described configuration, since the bicycle carrier is installed on the rear bumper back beam 10 of the vehicle in a manner that the bicycle carrier is not exposed to the outside normal times, but is automatically drawn from the bumper back beam 10 to enable the bicycle to be carried thereon if it is required to carry the bicycle, the exterior design can be maintained and convenience can be improved.

In particular, since the bicycle carrier device enables a rear-side vehicle to recognize carriage of a bicycle in a state where the bicycle is carried thereon, safety can be secured.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier device for a vehicle, comprising:
   a carrier portion provided on a lower side of a bumper back beam to slidably move in forward and backward directions to be drawn out from or accommodated in the bumper back beam, and provided with a panel portion and a sliding rail extending from both side ends of the panel portion in the forward and backward directions;
   an illumination plate disposed on the panel portion of the carrier portion to be rotatable in upward and downward directions and provided with a lamp mechanism that emits light toward the panel portion when being upwardly rotated;
   an extended support portion disposed on the carrier portion to extend and spread in both side directions of the carrier portion to carry a bicycle thereon; and
   an illumination mechanism disposed on the extended support portion to extend and spread in the both side directions, and configured to move along with the extended support portion and to emit light toward a rear side.

2. The bicycle carrier device of claim 1, wherein a guide rail that extends in the forward and backward directions is provided on the bumper back beam, and the sliding rail of the carrier portion is slidably connected to the guide rail.

3. The bicycle carrier device of claim 1, wherein an extended rail that extends to cross the sliding rail is fixed to the carrier portion, and the extended support portion is slidably connected to the extended rail to slide along the extended rail in the both side directions.

4. The bicycle carrier device of claim 1, wherein the illumination plate comprises:
   a rotating bracket installed on an upper side of the panel portion of the carrier portion to be rotatable in the upward and downward directions, and formed to extend over a predetermined length; and
   a switch bracket provided at an end of the rotating bracket to be drawn out in accordance with a user's operation in a state where the lamp mechanism is accommodated therein.

5. The bicycle carrier device of claim 4, wherein the rotating bracket has a lower end which is rotatably coupled to a front side of the panel portion and is rotatably installed at right angles in a horizontally lying state, and an upper end at which the switch bracket is fixedly installed.

6. The bicycle carrier device of claim 5, wherein the switch bracket comprises:
   a fixing portion fixedly disposed at the upper end of the rotating bracket;
   a guide portion fixed to a rear side of the fixing portion in a state where the rotary bracket is rotated at right angles, formed to surround the lamp mechanism, and having a rear end that is opened so that the lamp mechanism can be drawn out through the rear end; and
   a switch portion having a first end portion that is slidably installed on the fixing portion in the upward and downward directions and a second end portion bent downward after extending to an upper side and formed to penetrate an upper end of the guide portion.

7. The bicycle carrier device of claim 6, wherein the guide portion has a first fixing hole which is formed at the upper end thereof and through which the second end portion of the switch portion passes, a second fixing hole which is formed to be spaced apart for a predetermined distance from the first fixing hole to the rear side, and a guide hole formed at a front end thereof to be recessed for a predetermined distance in the upward and downward directions, wherein a rear end thereof is formed to be opened.

8. The bicycle carrier device of claim 7, wherein the lamp mechanism comprises:

an illumination portion provided to be movable on an inside of the guide portion and having a front end connected to the inside of the guide portion through an elastic member; and a locking projection formed to project from an upper end of the illumination portion and to be selectively inserted and locked in the first fixing hole or the second fixing hole of the guide portion as the illumination portion moves.

9. The bicycle carrier device of claim 7, wherein the first end portion of the switch portion is connected to the fixing portion through an elastic body and is provided with a guide projection formed thereon to be inserted into the guide hole, and the second end portion thereof horizontally extends for a predetermined distance toward the rear side after extending to an upper side and is bent downward to be inserted into the first fixing hole.

10. The bicycle carrier device of claim 1, wherein the illumination mechanism comprises:

a fixing rod fixedly disposed on the extended support portion;

a lamp bracket disposed on the fixing rod to be movable in the forward and backward directions or to be rotatable in a side direction and provided with a lamp portion emitting light toward the rear side; and a rotation adjusting portion fixed to the fixing rod to limit or permit rotation of the lamp bracket as the lamp bracket moves in the forward and backward directions.

11. The bicycle carrier device of claim 10, wherein the rotation adjusting portion is formed in a circular shape and has a position fixing groove recessively formed at mutually symmetrical positions on a circumference thereof, and the lamp bracket is formed to surround the circumference of the rotation adjusting portion and has a position fixing projection formed to project therefrom to be inserted into or withdrawn from the position fixing groove as moving in the forward and backward directions.

12. The bicycle carrier device as claimed in claim 10, wherein the lamp bracket is disposed on the fixing rod to be elastically supported in the forward and backward directions.

* * * * *